United States Patent [19]

Imashiro et al.

[11] Patent Number: 6,153,718
[45] Date of Patent: Nov. 28, 2000

[54] POLYURETHANE RESINS

[75] Inventors: Yasuo Imashiro; Ikuo Takahashi; Naofumi Horie; Takeshi Yamane, all of Tokyo, Japan

[73] Assignee: Nisshinbo Industries, Inc., Tokyo, Japan

[21] Appl. No.: 09/338,508

[22] Filed: Jun. 23, 1999

Related U.S. Application Data

[63] Continuation of application No. 08/821,200, Mar. 20, 1997, abandoned.

Foreign Application Priority Data

Apr. 2, 1996 [JP] Japan ................................. 8-104599

[51] Int. Cl.$^7$ ........................................... C08G 18/79
[52] U.S. Cl. ................................................... 528/67
[58] Field of Search ................................. 528/67

[56] References Cited

U.S. PATENT DOCUMENTS

| | | | |
|---|---|---|---|
| 4,102,870 | 7/1978 | Hofmann et al. | 528/73 |
| 4,234,728 | 11/1980 | Rody et al. | 544/198 |
| 4,419,294 | 12/1983 | Feldman et al. | 560/334 |
| 4,696,959 | 9/1987 | Chang et al. | 524/91 |
| 5,099,027 | 3/1992 | Vogl et al. | 548/259 |
| 5,246,993 | 9/1993 | Scherzer et al. | 524/195 |
| 5,264,518 | 11/1993 | Amano | 528/44 |
| 5,338,794 | 8/1994 | Imashiro et al. | 524/792 |
| 5,349,087 | 9/1994 | West | 564/252 |
| 5,357,021 | 10/1994 | Tye et al. | 528/28 |
| 5,360,933 | 11/1994 | Imashiro et al. | 564/252 |
| 5,637,769 | 6/1997 | Imashiro et al. | 564/59 |

*Primary Examiner*—Rabon Sergent
*Attorney, Agent, or Firm*—Kubovcik & Kubovcik

[57] ABSTRACT

A polyurethane resin obtained from a diol component and a diisocyanate component by an ordinary process, wherein the diisocyanate component comprises:

at least one kind of unmodified diisocyanate, and at least one kind of carbodiimide-modified aromatic diisocyanate having, at one or both of the ortho positions of the two isocyanate groups, an aliphatic, alicyclic or aromatic substituent of one or more carbon atoms, or at least one kind of carbodiimide-modified aliphatic diisocyanate wherein at least one of the two carbons each bonded with an isocyanate group is di- or tri-substituted, and the molar ratio of the unmodified diisocyanate and the carbodiimide-modified diisocyanate is 35–0.1:1. The polyurethane resin containing carbodiimide bonds in the molecular chain alleviates the problems of the prior art and exhibits hydrolysis resistance stably over a long period of time without losing the carbodiimide bonds out of the molecule.

8 Claims, No Drawings

POLYURETHANE RESINS

This application is a continuation of application Ser. No. 08/821,200, filed Mar. 20, 1997, abandoned.

BACKGROUND OF THE INVENTION

1. Field of the Invention

The present invention relates to a novel polyurethane resin. More particularly, the present invention relates to a polyurethane resin which contains carbodiimide groups in the molecular chain and which shows water resistance stably over a long period of time.

2. Prior Art

Polyurethane resins have high elasticity and are in use in various applications such as molded product, thread, coating film, etc. Meanwhile, they are inferior in chemical resistance, heat resistance and water resistance and, therefore, have not been used in the applications where said properties are required, such as hose and packing for automobile engine and peripherals.

Of various polyurethane resins, polyester polyurethane resins obtained from a polyester polyol contain a large number of ester bonds in the molecule and, when used under high-temperature and high-humidity conditions, give rise to hydrolysis of ester bonds and consequent molecular weight reduction, inviting deterioration of strength and elastic modulus.

In order to alleviate the above-mentioned problems of polyurethane resin caused by ester bond hydrolysis and consequent molecular weight reduction, it has heretofore been proposed to add an additive to a polyurethane resin. An example of such proposals is to add epoxy, oxazoline, carbodiimide or the like to a polyurethane resin to allow the additive to trap the carboxyl group formed by hydrolysis of the polyurethane resin and extend the life of the polyurethane resin.

However, since the additive is simply added to a polyurethane resin, the additive bleeds out onto the surface of the polyurethane resin; when the additive is added to a polyurethane resin which comes into contact with a solvent or an oil, the additive is extracted by the solvent or oil, inviting the performance deterioration of the solvent or oil and the reduction in hydrolysis resistance of the polyurethane resin. Therefore, the effect of addition of the above additive to polyurethane resin as a hydrolysis resistant is not fully satisfactory.

Moreover, since the above additive is generally a powdery solid of high melting point, dispersion thereof in polyurethane resin needs a very complicated apparatus and a fairly long time.

OBJECT AND SUMMARY OF THE INVENTION

The object of the present invention is to eliminate the above-mentioned drawbacks of the prior art and provide a polyurethane resin containing carbodiimide bonds in the molecular chain, which exhibits hydrolysis resistance stably over a long period of time without losing the carbodiimide bonds out of the molecule and which has improved heat resistance.

According to the present invention, there is provided a polyurethane resin obtained from a diol component and a diisocyanate component by an ordinary process, wherein the diisocyanate component comprises:

at least one kind of unmodified diisocyanate, and at least one kind of carbodiimide-modified aromatic diisocyanate having, at one or both of the ortho positions of the two isocyanate groups, an aliphatic, alicyclic or aromatic substituent of one or more carbon atoms, and the molar ratio of the unmodified diisocyanate and the carbodiimide-modified aromatic diisocyanate is 35–0.1:1.

According to the present invention, there is also provided a polyurethane resin obtained from a diol component and a diisocyanate component by an ordinary process, wherein the diisocyanate component comprises:

at least one kind of unmodified diisocyanate, and at least one kind of carbodiimide-modified aliphatic diisocyanate wherein at least one of the two carbons each bonded with an isocyanate group is di- or tri-substituted, and the molar ratio of the unmodified diisocyanate and the carbodiimide-modified aliphatic diisocyanate is 35–0.1:1.

DETAILED DESCRIPTION OF THE INVENTION

The present invention is hereinafter described in detail.

As mentioned above, the polyurethane resin of the present invention is obtained from a diol component and a diisocyanate component by an ordinary process. The diol component as the first component of the polyurethane resin can be any diol as long as it has conventionally been used in production of polyurethane resin. The diol can be exemplified by saturated or unsaturated low-molecular glycols such as ethylene glycol, 1,2-propanediol, 1,3-propanediol, 1,4-butanediol, neopentyl glycol, pentanediol, hexanediol, octanediol, 1,4-butenediol, diethylene glycol, triethylene glycol, dipropylene glycol and the like; alkyl glycidyl ethers such as n-butyl glycidyl ether, 2-ethyl-hexyl glycidyl ether and the like; polyester polyols obtained by subjecting, to dehydration and condensation, a monocarboxylic acid-glycidyl alcohol ester (e.g. versatic acid-glycidyl alcohol ester) and a dibasic acid or an anhydride thereof (e.g. adipic acid, phthalic acid, isophthalic acid, terephthalic acid, maleic acid, fumaric acid, succinic acid, oxalic acid, malonic acid, glutaric acid, pimelic acid, suberic acid, azelaic acid, sebacic acid or dimer acid); and polyester polyols obtained by subjecting a cyclic ester compound to ring-opening polymerization.

The polyurethane resin of the present invention is not different from conventional urethane resins in that it is composed of a diol component and a diisocyanate component. However, the present polyurethane resin is characterized in that the diisocyanate component as the second component of the resin comprises at least one kind of unmodified diisocyanate and at least one kind of carbodiimide-modified diisocyanate.

In Japanese Patent Application Laid-Open No. 5-302050 is disclosed a printing ink using a urethane resin composition composed of a polyol, a carbodiimide-modified diisocyanate, a chain extender, etc. The urethane resin described in the literature, however, uses, as the isocyanate component, only a carbodiimide-modified diisocyanate and, therefore, is low in elastic modulus as shown in Comparative Examples described later and has no satisfactory properties for use as general elastomer, molding material, artificial leather, sealing agent or film.

The unmodified diisocyanate, which is one of the second component of the present polyurethane resin, can be any unmodified diisocyanate as long as it has conventionally been used in production of polyurethane resin. The unmodified diisocyanate can be exemplified by 1,5-naphthylene diisocyanate, 4,4'-diphenylmethane diisocyanate, 4,4'- diphenyldimethylmethane diisocyanate, 4,4'-dibenzyl diisocyanate, dialkyldiphenylmethane diisocyanate, 1,3-phenylene diisocyanate, 1,4-phenylene diisocyanate, tolylene diisocyanate, butane-1,4-diisocyanate, hexamethylene diisocyanate, isopropylene diisocyanate, naphthylene diisocyanate, methylene diisocyanate, 2,2,4-trimethylhexamethylene diisocyanate, cyclohexane-1,4-diisocyanate, xylylene diisocyanate, hydrogenated xylylene diisocyanate, isophorone diisocyanate, lysine diisocyanate, dicyclohexylmethane-4,4'-diisocyanate, 1,3-bis(isocyanatomethyl)cyclohexane, methyl-cyclohexane diisocyanate, m-tetramethylxylylene diisocyanate, 2,4,6-triisopropylbenzene diisocyanate, isopropylidene bis(4-cyclohexylisocyanate) and tolidine diisocyanate.

The carbodiimide-modified diisocyanate, which is the other of the second component of the present polyurethane resin, includes a carbodiimide-modified aromatic diisodyanate of high steric hindrance having, at one or both of the ortho positions of the two isocyanate groups, an aliphatic, alicyclic or aromatic substituent of one or more carbon atoms. Specific examples of such a carbodiimide-modified aromatic diisocyanate are those derived from a diisocyanate selected from the group consisting of 2,4,6-triisopropylbenzene diisocyanate represented by the following formula:

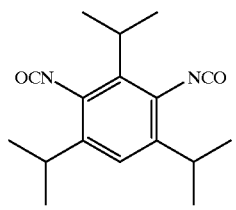

diethyltolylene diisocyanate represented by the following formulas:

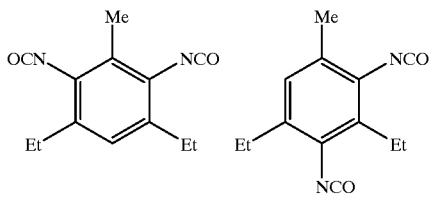

(either one or a mixture of the two) and 3,3'-diethyl-5,5'-dimethyl-4,4'-diphenylmethane diisocyanate represented by the following formula:

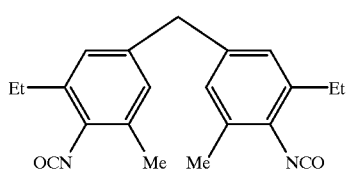

The carbodiimide-modified diisocyanate, which is the other of the second component of the present polyurethane resin, also includes a carbodiimide-modified aliphatic diisocyanate wherein at least one of the two carbons each bonded with an isocyanate group is di- or tri-substituted. Specific examples of such a carbodiimide-modified aliphatic diisocyanate are those derived from a diisocyanate selected from the group consisting of 4,4'-dicyclohexylmethane diisocyanate represented by the following formula:

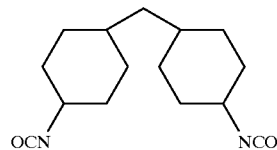

tetramethylxylylene diisocyanate represented by the following formula:

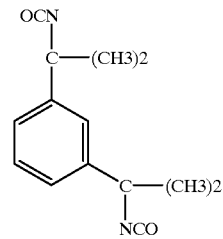

and isophorone diisocyanate represented by the following formula:

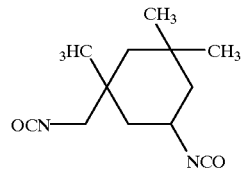

The above-mentioned diisocyanates may be used singly or in admixture of two or more compounds. However, when there is used an aromatic diisocyanate of low steric hindrance or an aliphatic diisocyanate wherein the carbon(s) bonded with an isocyanate group is mono-substituted or is not substituted, for example, 4,4'-diphenylmethane diisocyanate represented by the following formula:

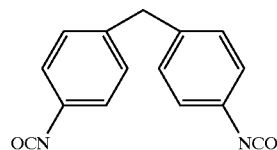

or hexamethylene diisocyanate represented by OCN—$(CH_2)_6$—NCO, it is impossible to obtain a carbodiimide-modified diisocyanate usable in the present invention, because crosslinking between carbodiimide groups or uretone-imine crosslinking between carbodiimide and isocyanate takes place, inviting thickening and solidification.

The carbodiimide-modified diisocyanate can be synthesized from the above-mentioned diisocyanate by a reaction using a carbodiimidization catalyst.

The carbodiimidization catalyst is preferably an organic phosphorus type compound, particularly preferably phospholene oxide in view of the activity. Specific examples thereof are 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide and double bond isomers thereof. Of these, 3-methyl-1-phenyl-2-phospholene-1-oxide, which is commercially available, is particularly preferred.

The carbodiimide-modified diisocyanate can be produced by a known process. It can be produced, for example, by adding, to the above-mentioned diisocyanate, the above-mentioned catalyst in an amount of 0.1–10% by weight (a larger amount is possible when the economy is neglected), preferably 0.5–5% by weight based on the diisocyanate, in the presence or absence of a solvent inert to the isocyanate, in an inert gas (e.g. nitrogen) current or with the inert gas bubbled through the solvent, and stirring the mixture at 120–200° C. to give rise to carbon dioxide elimination and condensation.

The rate of the carbodiimidization varies depending upon the kind of the diisocyanate used, and too high a rate makes it difficult to control the polymerization degree. Therefore, it is preferable to allow the reaction to proceed at an appropriate catalyst amount and at an appropriate reaction temperature. For example, in carbodiimide-modifying an aliphatic diisocyanate, the catalyst amount can be 0.1–10% by weight, preferably 0.5–5% by weight and the reaction temperature can be 120–200° C.; and in carbodiimide-modifying an aromatic diisocyanate, the catalyst amount can be 0.01–5% by weight, preferably 0.05–1% by weight and the reaction temperature can be 50–180° C.

The thus-produced carbodiimide-modified diisocyanate has preferably 1–20, more preferably 1–15 carbodiimide groups because such a carbodiimide-modified diisocyanate has a low melting point and a low viscosity and can be easily dispersed in or mixed with other materials for polyurethane resin.

The polyurethane resin of the present invention can be produced by reacting the above-mentioned diol component and the above-mentioned diisocyanate component comprising at least one kind of unmodified diisocyanate and at least one kind of carbodiimide-modified diisocyanate, according to an ordinary process.

The above urethanization is conducted at 20–200° C., preferably at 60–150° C. Since this urethanization is an exothermic reaction, it is difficult to control the reaction temperature strictly. However, when the reaction temperature is too low, the reaction rate is small and a long time is required; when the reaction temperature is too high, the reaction rate is too large and insufficient mixing occurs, inviting nonuniform reaction and deterioration (burning) of polyurethane resin formed.

When the urethanization rate is small, it is possible to use an ordinary urethanization catalyst, for example, an amine (e.g. triethylenediamine) or an organotin (e.g. dibutyltin dilaurate) in an amount of 0.001–1% by weight based on the polyurethane resin formed. It is also possible to use, at the time of synthesis, at least one kind of solvent such as dimethylformamide (DMF), tetrahydrofuran (THF), methyl ethyl ketone (MEK), toluene or the like.

It is also possible to (1) react a diol component with a diisocyanate component to synthesize an isocyanate group-terminated prepolymer, and add, to the prepolymer, a chain extender consisting of a diol (e.g. butanediol, ethylene glycol or propylene glycol) or a. diamine (e.g. ethylenediamine, propylenediamine, triethylenediamine, butylenediamine or hexylenediamine), or (2) react a diol component with an unmodified diisocyanate to synthesize a hydroxyl group-terminated prepolymer, and add a carbodiimide-modified diisocyanate to the prepolymer, or (3) react a diol component with an unmodified diisocyanate to synthesize a hydroxyl group-terminated prepolymer, react the prepolymer with a carbodiimide-modified diisocyanate, and add a chain extender to the reaction product.

It is also possible to (1) react a diol component with a carbodiimide-modified diisocyanate to synthesize a hydroxyl group-terminated prepolymer, and react the prepolymer with an unmodified diisocyanate, or (2) react a diol component with a carbodiimide-modified diisocyanate to synthesize a hydroxyl group-terminated prepolymer, react the prepolymer with an unmodified diisocyanate to synthesize an isocyanate group-terminated prepolymer, and add a chain extender to the prepolymer, or (3) react a diol component with a carbodiimide-modified diisocyanate and a diol component with an unmodified diisocyanate to synthesize a hydroxyl group-terminated prepolymer and an isocyanate group-terminated prepolymer, and mixing the two prepolymers, or (4) react a diol component with a carbodiimide-modified diisocyanate and a diol component with an unmodified diisocyanate to synthesize a hydroxyl group-terminated prepolymer and an isocyanate group-terminated prepolymer, mixing the two prepolymers, and add a chain extender to the mixture.

It is also possible to add, to a carbodiimide-modified diisocyanate or an isocyanate group-terminated prepolymer, a known isocyanate-blocking agent such as phenol (e.g. phenol or xylenol), aliphatic alcohol (e.g. methanol, ethanol, isopropanol or cyclohexyl alcohol), oxime (e.g. methyl ethyl ketoxime), amine, amide, imide, lactam (e.g. ε-caprolactam), dicarbonyl compound (e.g. diethyl malonate or ethyl aceto-acetate) or the like to block the isocyanate group, and heating the resulting product with a hydroxyl group-terminated prepolymer and a chain extender (e.g. bifunctional or higher alcohol or amine) to regenerate the isocyanate, and react with hydroxyl group to synthesize a polyurethane.

In the above reaction, it is possible to add an appropriate amount of a carbodiimidization catalyst to the urethanization system to convert part of the isocyanate groups remaining in the system into carbodiimide groups and thereby introduce carbodiimide bonds into the molecule of the polyurethane resin formed.

In the above reaction, the amount of the carbodiimidization catalyst differs depending upon the isocyanate group content in the material to be reacted, the kind and amount of the urethanization catalyst used, and the urethanization temperature employed.

In the present polyurethane resin produced as above, the molar ratio of the unmodified diisocyanate and the carbodiimide-modified diisocyanate can be, for example, 35–0.1:1, preferably 10–0.5:1. When the content of the unmodified diisocyanate is more than the upper limit, the resulting polyurethane resin has low hydrolysis resistance; and when the content is less than the lower limit, it is impossible to obtain a polyurethane resin of high elasticity.

In the present polyurethane resin, the content of carbodiimide groups possessed by at least one kind of carbodiimide-modified diisocyanate is preferably $1 \times 10^{-2}$ to $1 \times 10^{-6}$ mole, more preferably $1 \times 10^{-3}$ to $1 \times 10^{-5}$ mole per g of the polyurethane resin. When the content of carbodiimide groups is lower than the lower limit, the resulting polyurethane resin has low hydrolysis resistance; and when the content of carbodiimide groups is higher than the upper limit, the resulting polyurethane resin has too low elasticity, making it impossible to obtain a satisfactory polyurethane resin.

In the present polyurethane resin, the molecular weight can be, for example, 5,000–200,000 and the index (NCO/OH) can be, for example, 0.8–1.5, preferably 1.0–1.1.

The present polyurethane resin is obtained as a substance which is solid at atmospheric temperature, when no solvent is used in the production. Therefore, it can be used in a solution form after being dissolved in a solvent, or as a powder form after being ground; or, can be molded or spun by the use of an extruder or an injection molding machine at 150–250° C., preferably at 170–200° C. to obtain a product. Needless to say, it is possible to introduce a polyurethane resin before solidification into an extruder or the like, wherein melt kneading is conducted to complete urethanization.

During the production of the present polyurethane resin, it is possible to add, with no problem, known additives such as oxidation inhibitor, ultraviolet absorber, light stabilizer and the like.

The present invention is hereinafter described in more detail by way of Examples.

[Synthesis of carbodiimide-modified diisocyanates]

<Synthesis Example 1>

In a 500-ml separable flask equipped with a condenser tube were placed 200 g of 4,4'-dicyclohexylmethane diisocyanate and 1 g of 3-methyl-1-phenyl-2-phospholene-1-oxide. They were stirred by the use of a mechanical stirrer in a nitrogen current at 185° C. for 3 hours to obtain a carbodiimide-modified diisocyanate having an average molecular weight of 480 and an average polymerization degree of n=1.

<Synthesis Examples 2 to 36>

Carbodiimide-modified diisocyanates shown in Table 1 were obtained by conducting the same operation as in Synthesis Example 1 except that the reaction time and the diisocyanate were changed. Incidentally, in Synthesis Examples 19–36, the catalyst amount was 0.3%.

TABLE 1

| No. of Synthesis Example | Diisocyanate used | Average degree of polymerization |
|---|---|---|
| 1 | HMDI | 1 |
| 2 | HMDI | 3 |
| 3 | HMDI | 5 |
| 4 | HMDI | 7 |
| 5 | HMDI | 10 |
| 6 | HMDI | 15 |
| 7 | IPDI | 1 |
| 8 | IPDI | 3 |
| 9 | IPDI | 5 |
| 10 | IPDI | 7 |
| 11 | IPDI | 10 |
| 12 | IPDI | 15 |
| 13 | TMXDI | 1 |
| 14 | TMXDI | 3 |
| 15 | TMXDI | 5 |
| 16 | TMXDI | 7 |
| 17 | TMXDI | 10 |
| 18 | TMXDI | 15 |
| 19 | E,M-MDI | 1 |
| 20 | E,M-MDI | 3 |
| 21 | E,M-MDI | 5 |
| 22 | E,M-MDI | 7 |
| 23 | E,M-MDI | 10 |
| 24 | E,M-MDI | 15 |
| 25 | E-TDI | 1 |
| 26 | E-TDI | 3 |
| 27 | E-TDI | 5 |
| 28 | E-TDI | 7 |
| 29 | E-TDI | 10 |
| 30 | E-TDI | 15 |
| 31 | TIDI | 1 |
| 32 | TIDI | 3 |
| 33 | TIDI | 5 |
| 34 | TIDI | 7 |
| 35 | TIDI | 10 |
| 36 | TIDI | 15 |

In Table 1, the diisocyanates shown are as follows.
HMDI: 4,4'-dicyclohexylmethane diisocyanate
IPDI: isophorone diisocyanate
TMXDI: tetramethylxylylene diisocyanate
E,M-MDI: 3,3'-ethyl-5,5'-methyl-4,4'-diphenyl-methane diisocyanate
E-TDI: diethyltolylene diisocyanate
TIDI: 2,4,6-triisopropylbenzene diisocyanate

[Synthesis of polyurethane resins]

<Examples 1A to 36B>

To 2,113 g of a polyester polyol having an average molecular weight of 2,113 composed of adipic acid/ethylene glycol/propylene glycol were added 4,4'-diphenylmethane diisocyanate and one of the carbodiimide-modified diisocyanates obtained in Synthesis Examples 1–36, in respective amounts shown in Tables 2. Each mixture was subjected to a reaction at 80° C. for 5 hours to obtain various prepolymers. One of the prepolymers and 200 g of butane diol were reacted by the use of a melt extrusion reactor; the resulting polyurethane was extruded at a final temperature of 185° C. by the use of a T-die having a thickness of 250 μm to obtain various films; and each film was wound up by a winder.

TABLE 2

| Example | Diisocyanates | A | B | C | D | E |
|---|---|---|---|---|---|---|
|  | MDI | 821 | 721 | 596 | 423 | 346 |
| 1 | Syn. Ex. 1 | 48 | 240 | 480 | 812 | 960 |
| 2 | Syn. Ex. 2 | 92 | 458 | 916 | 1550 | — |
| 3 | Syn. Ex. 3 | 135 | 676 | 1352 | 2288 | — |
| 4 | Syn. Ex. 4 | 279 | 894 | 1788 | — | — |
| 5 | Syn. Ex. 5 | 244 | 1221 | 2442 | — | — |
| 6 | Syn. Ex. 6 | 353 | 1766 | — | — | — |
| 7 | Syn. Ex. 7 | 44 | 222 | 444 | 751 | 888 |
| 8 | Syn. Ex. 8 | 84 | 422 | 844 | 1428 | 1688 |
| 9 | Syn. Ex. 9 | 124 | 622 | 1244 | — | — |
| 10 | Syn. Ex. 10 | 162 | 822 | 1644 | — | — |
| 11 | Syn. Ex. 11 | 244 | 1122 | 2244 | — | — |
| 12 | Syn. Ex. 12 | 224 | 1622 | — | — | — |
| 13 | Syn. Ex. 13 | 40 | 200 | 400 | 677 | 800 |
| 14 | Syn. Ex. 14 | 76 | 379 | 757 | 1281 | 1514 |
| 15 | Syn. Ex. 15 | 111 | 557 | 1113 | — | — |
| 16 | Syn. Ex. 16 | 147 | 735 | 1470 | — | — |
| 17 | Syn. Ex. 17 | 201 | 1003 | 2005 | — | — |
| 18 | Syn. Ex. 18 | 290 | 1448 | — | — | — |
| 19 | Syn. Ex. 19 | 75 | 374 | 748 | 1266 | 1496 |
| 20 | Syn. Ex. 20 | 145 | 726 | 1452 | — | — |
| 21 | Syn. Ex. 21 | 216 | 1078 | — | — | — |
| 22 | Syn. Ex. 22 | 286 | 1430 | — | — | — |
| 23 | Syn. Ex. 23 | 392 | — | — | — | — |
| 24 | Syn. Ex. 24 | 568 | — | — | — | — |
| 25 | Syn. Ex. 25 | 42 | 210 | 420 | 711 | 840 |
| 26 | Syn. Ex. 26 | 80 | 398 | 796 | 1347 | 1592 |
| 27 | Syn. Ex. 27 | 177 | 586 | 1172 | — | — |
| 28 | Syn. Ex. 28 | 155 | 774 | 1548 | — | — |
| 29 | Syn. Ex. 29 | 211 | 1056 | 2112 | — | — |
| 30 | Syn. Ex. 30 | 305 | 1526 | — | — | — |
| 31 | Syn. Ex. 31 | 53 | 266 | 532 | 900 | 1064 |
| 32 | Syn. Ex. 32 | 102 | 510 | 1020 | 1725 | — |
| 33 | Syn. Ex. 33 | 151 | 754 | 1508 | — | — |
| 34 | Syn. Ex. 34 | 200 | 998 | 1996 | — | — |
| 35 | Syn. Ex. 35 | 273 | 1364 | — | — | — |
| 36 | Syn. Ex. 36 | 395 | 1974 | — | — | — |

In Tables 2–4, MDI refers to 4,4'-diphenylmethane diisocyanate; and Example 1A, for example, indicates that in the column A of Table 2, there were used 821 g of 4,4'-diphenylmethane diisocyanate and 48 g of the carbodiimide-modified diisocyanate of Synthesis Example 1.

<Comparative Example 1>

To 2,113 g of a polyester polyol having an average molecular weight of 2,113 composed of adipic acid/ethylene glycol/propylene glycol was added 846 g of 4,4'-diphenylmethane diisocyanate. The mixture was subjected to a reaction at 80° C. for 5 hours to obtain a prepolymer. The prepolymer and 200 g of butane diol were reacted by the use of a melt extrusion reactor; the resulting polyurethane was extruded at a final temperature of 185° C. by the use of a T-die having a thickness of 250 μm to obtain a film; and the film was wound up by a winder.

[Hydrolysis test]

Each of the polyurethane films obtained in Examples 1A to 36B and Comparative Example 1 was subjected to punching to obtain a test piece of dumbbell shape. Each test piece was immersed in water of 95° C., taken out in the 15th day, and measured for tensile strength retention (%). The results are shown in Table 3. Incidentally, the polyurethane film of Comparative Example 1 broke.

TABLE 3

| Example | A | B | C | D | E |
|---|---|---|---|---|---|
| 1 | 58 | 60 | 63 | 70 | 75 |
| 2 | 59 | 62 | 65 | 73 | 77 |
| 3 | 62 | 67 | 69 | 72 | — |
| 4 | 65 | 68 | 70 | — | — |
| 5 | 68 | 72 | 75 | — | — |
| 6 | 72 | 74 | — | — | — |
| 7 | 43 | 47 | 52 | 60 | 63 |
| 8 | 45 | 49 | 54 | 62 | 68 |
| 9 | 52 | 49 | 56 | — | — |
| 10 | 60 | 62 | 64 | — | — |
| 11 | 62 | 55 | 67 | — | — |
| 12 | 65 | 68 | — | — | — |
| 13 | 72 | 74 | 78 | 80 | 82 |
| 14 | 72 | 75 | 80 | 83 | 85 |
| 15 | 74 | 77 | 82 | — | — |
| 16 | 76 | 79 | 86 | — | — |
| 17 | 79 | 80 | 86 | — | — |
| 18 | 82 | 85 | — | — | — |
| 19 | 36 | 42 | 45 | 49 | 56 |
| 20 | 39 | 44 | 48 | — | — |
| 21 | 43 | 47 | — | — | — |
| 22 | 47 | 50 | — | — | — |
| 23 | 52 | — | — | — | — |
| 24 | 59 | — | — | — | — |
| 25 | 40 | 44 | 46 | 49 | 52 |
| 26 | 43 | 47 | 49 | 54 | 57 |
| 27 | 47 | 50 | 56 | — | — |
| 28 | 52 | 54 | 62 | — | — |
| 29 | 56 | 58 | 65 | — | — |
| 30 | 59 | 64 | — | — | — |
| 31 | 60 | 62 | 65 | 64 | 70 |
| 32 | 63 | 64 | 67 | 68 | — |
| 33 | 65 | 67 | 69 | — | — |
| 34 | 69 | 70 | 72 | — | — |
| 35 | 72 | 74 | — | — | — |
| 36 | 74 | 79 | — | — | — |

[Synthesis of polyurethane resins]

Comparative Examples 2–10>

To 2,113 g of a polyester polyol having an average molecular weight of 2,113 composed of adipic acid/ethylene glycol/propylene glycol was added a carbodiimide-modified diisocyanate shown in Table 4, in an amount shown in Table 4. The mixture was subjected to a reaction at 80° C. for 5 hours to obtain a prepolymer. The prepolymer and 200 g of butane diol were reacted by the use of a melt extrusion reactor; and the resulting polyurethane was extruded at a final temperature of 185° C. by the use of a T-die having a thickness of 250 μm. However, each polyurethane obtained had low elasticity and could not be extruded into a film shape.

TABLE 4

| | Carbodiimide-modified diisocyanate | | |
|---|---|---|---|
| Comparative Example | Diisocyanate used | Average polymerization degree | Amount used |
| 2 | HMDI | 3 | 3100 |
| 3 | HMDI | 5 | 4575 |
| 4 | HMDI | 10 | 8264 |
| 5 | IPDI | 3 | 2562 |
| 6 | IPDI | 5 | 3766 |
| 7 | IPDI | 10 | 6785 |
| 8 | TMXDI | 3 | 2856 |
| 9 | TMXDI | 5 | 4210 |
| 10 | TMXDI | 10 | 7594 |
| 11 | TIDI | 3 | 4914 |
| 12 | TIDI | 5 | 7296 |
| 13 | TIDI | 10 | 13252 |
| 14 | E,M-MDI | 3 | 2694 |
| 15 | E,M-MDI | 5 | 3966 |
| 16 | E,M-MDI | 10 | 7147 |
| 17 | E-TDI | 3 | 3452 |
| 18 | E-TDI | 5 | 5103 |
| 19 | E-TDI | 10 | 9232 |

As is clear from the above, the present invention provides a polyurethane resin having carbodiimide bonds in the molecular chain, which exhibits water resistance stably over a long period of time.

What is claimed is:

1. A polyurethane resin obtained from a diol component and a diisocyanate component, wherein the diisocyanate component comprises:

at least one unmodified diisocyanate, and at least one carbodiimide-modified aromatic diisocyanate having, at one or both of the positions ortho to each of the two isocyanate groups, an aliphatic, alicyclic or aromatic substituent of one or more carbon atoms, the molar ratio of the unmodified diisocyanate to the carbodiimide-modified aromatic diisocyanate being 35–0.1:1.

2. A polyurethane resin according to claim 1, wherein the carbodiimide-modified aromatic diisocyanate is derived from a diisocyanate selected from the group consisting of 2,4,6-triisopropylbenzene diisocyanate, diethyltolylene diisocyanate and 3,3'-diethyl-5,5'-dimethyl-4,4'-diphenylmethane diisocyanate.

3. A polyurethane resin according to claim 1, wherein a carbodiimide group content possessed by the carbodiimide-modified aromatic diisocyanate is $1 \times 10^{-2}$ to $1 \times 10^{-6}$ mole per g of the polyurethane resin.

4. A polyurethane resin according to claim 1, wherein the carbodiimide-modified aromatic diisocyanate has 1–20 carbodiimide groups.

5. A polyurethane resin obtained from a diol component and a diisocyanate component, wherein the diisocyanate component comprises:

at least one unmodified diisocyanate, and at least one carbodiimide-modified aliphatic diisocyanate wherein at least one of the two carbons each bonded with an isocyanate group is di- or tri-substituted, and the molar ratio of the unmodified diisocyanate to the carbodiimide-modified aliphatic diisocyanate is 35–0.1:1.

6. A polyurethane resin according to claim 5, wherein the carbodiimide-modified aliphatic diisocyanate is derived from a diisocyanate selected from the group consisting of 4,4'-dicyclohexylmethane diisocyanate, tetramethylxylylene diisocyanate and isophorone diisocyanate.

7. A polyurethane resin according to claim 5, wherein a carbodiimide group content possessed by the carbodiimide-modified aliphatic diisocyanate is $1 \times 10^{-2}$ to $1 \times 10^{-6}$ mole per g of the polyurethane resin.

8. A polyurethane resin according to claim 5, wherein the carbodiimide-modified aliphatic diisocyanate has 1–20 carbodiimide groups.

* * * * *